United States Patent
Wang et al.

(10) Patent No.: US 12,033,223 B2
(45) Date of Patent: Jul. 9, 2024

(54) GROUP DIVISION METHOD BASED ON SOCIAL RELATIONSHIP IN COMBINATION WITH SELFISH PREFERENCE ORDER

(71) Applicant: NANJING UNIVERSITY OF POSTS AND TELECOMMUNICATIONS, Jiangsu (CN)

(72) Inventors: Haiyan Wang, Jiangsu (CN); Chenyi Wang, Jiangsu (CN); Zhousheng Wang, Jiangsu (CN); Yicheng Yang, Jiangsu (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 204 days.

(21) Appl. No.: 17/795,453

(22) PCT Filed: Mar. 10, 2021

(86) PCT No.: PCT/CN2021/079866
§ 371 (c)(1),
(2) Date: Jul. 26, 2022

(87) PCT Pub. No.: WO2021/197001
PCT Pub. Date: Oct. 7, 2021

(65) Prior Publication Data
US 2023/0091117 A1   Mar. 23, 2023

(30) Foreign Application Priority Data
Apr. 3, 2020   (CN) .......................... 202010259534.1

(51) Int. Cl.
*G06Q 50/00*   (2024.01)
*G06Q 10/04*   (2023.01)

(52) U.S. Cl.
CPC .............. *G06Q 50/01* (2013.01); *G06Q 10/04* (2013.01)

(58) Field of Classification Search
CPC ..... G06Q 50/01; G06Q 10/04; G06F 16/9536
See application file for complete search history.

(56) References Cited

U.S. PATENT DOCUMENTS

2018/0300821 A1   10/2018   Wiseman et al.

FOREIGN PATENT DOCUMENTS

| CN | 110209954 | 9/2019 |
| CN | 111488532 | 8/2020 |

OTHER PUBLICATIONS

Yunchang Wu, Baisong Liu, Yangyang Wang, Chenjie Fei. Review of group recommendation analysis and research[J]. Telecommunications Science, 2018, 34(12): 71-83. (Year: 2018).*

(Continued)

*Primary Examiner* — Florian M Zeender
*Assistant Examiner* — Emily M. Kraisinger
(74) *Attorney, Agent, or Firm* — NIXON & VANDERHYE

(57) ABSTRACT

A group division method based on a social relationship in combination with a selfish preference order is provided, the method includes the following steps: step 1, forming a preliminary group by simulating choices of users to gather into groups for sharing cost based on social values of the users; and step 2, drawing up combining and splitting rules according to a selfish preference order, subjecting the groups obtained in step 1 to combining or splitting on a basis of the combining and splitting rules, and ending the combining or splitting upon reaching a Nash equilibrium point, thereby obtaining stable groups. In the scenario of a static game with complete information, a Nash equilibrium point is found out based on the combination of a social relationship and a (Continued)

selfish preference order, so that the stability of group division is improved, and extreme users are removed.

10 Claims, 1 Drawing Sheet

(56) References Cited

OTHER PUBLICATIONS

International Search Report dated Jun. 9, 2021, for PCT/CN2021/079866, 8 pp, including English translation.
Written Opinion of the ISA dated Jun. 9, 2021, for PCT/CN2021/079866, 8 pp, including partial English translation.

\* cited by examiner

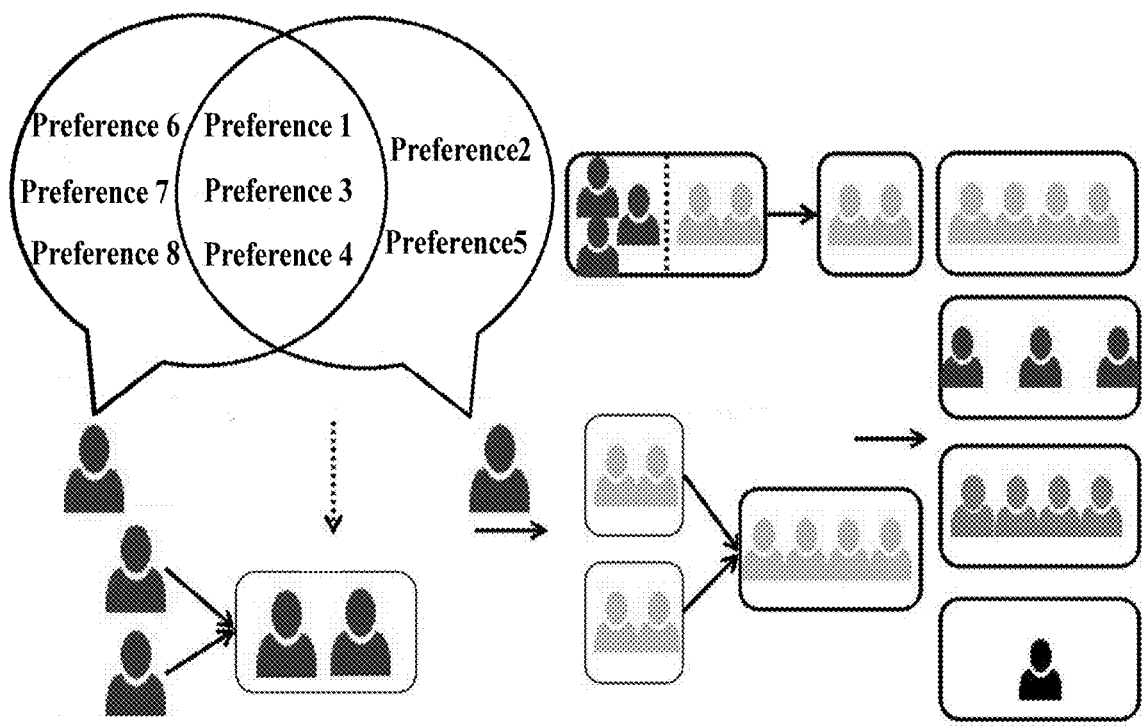

GROUP DIVISION METHOD BASED ON SOCIAL RELATIONSHIP IN COMBINATION WITH SELFISH PREFERENCE ORDER

CROSS REFERENCE TO RELATED APPLICATIONS

This patent application represents the US national stage of PCT/CN2021/079866, filed Mar. 10, 2021, which claims the benefit and priority of Chinese Patent Application No. 202010259534.1, filed with the China National Intellectual Property Administration (CNIPA) on Apr. 3, 2020 and entitled "GROUP DIVISION METHOD BASED ON SOCIAL RELATIONSHIP IN COMBINATION WITH SELFISH PREFERENCE ORDER". Both of the aforementioned applications are incorporated herein by reference in their entireties.

BACKGROUND OF THE INVENTION

Field of the Invention

The present disclosure relates to the cross field of information service and distributed calculation, and in particular, to a group division technique in the field of group recommendation.

Description of the Related Art

Conventional recommendation methods are mostly to make recommendation to an individual. With the development of economy and the continuous innovation of Internet technology, more and more activities in real life are completed by groups, therefore, it would be crucial to recommend an item that can be accepted by all group users to them.

Group recommendation is intended to provide recommendations for a group of users, and group division is also very important as the basis of group recommendation. Unfortunately, in existing research on group division, most methods tend to merely focus on same interest preferences of users and ignore the influence of users' social relationships on recommendation results, and do not take into account the positive impact of a user's selfish behavior on the division result. All of these will cause serious damage to recommendation results if there are extreme users in a group, and will affect the satisfaction with the recommendations.

SUMMARY OF THE INVENTION

An object of the present disclosure: in view of the shortcomings in the prior art, the present disclosure proposes a group division method based on a social relationship in combination with a selfish preference order, which is intended to remove extreme users by stably dividing a group to improve the satisfaction with recommendations.

Technical solutions: a group division method based on social relationship in combination with a selfish preference order includes the following steps.

In step 1, a preliminary group is formed by simulating the choice of users to gather into groups for sharing cost based on social values of the users; and in step 2, combining and splitting rules are drawn up according to a selfish preference order, the group obtained in step 1 is subjected to combining or splitting on the basis of the combining and splitting rules, and the combining or splitting are ended upon reaching a Nash equilibrium point, thereby obtaining a stable group.

Simulating choices of users to gather into groups for sharing cost based on social values of the users may be expressed as: $M=\{S, v, F, A, P\}$, where S represents a decision-making user set, while v represents a utility function, F represents a decision function for deciding whether each user joins or leaves the groups, $A=\{a_1, a_2, \ldots, a_N\}$ represents a total user decision set, $a_n$ represents group n, and P represents a group structure $P=\{CO_1, CO_2, \ldots, CO_n\}$, with $CO_n$ representing a structural characteristic of group $a_n$, and the utility function is defined as the cost of the current group to which a user belongs.

In some embodiments, the social value of user n may be expressed as:

$$S_n(a_n, a_{-n}) = \sum_i \beta_i - l_n. \tag{1}$$

In some embodiments, the cost of group $a_n$ to which the user belongs may be expressed as:

$$r_n(a_n, a_{J_n}) = \begin{cases} \sum_{i=1}^{l_n} \frac{a_0}{\beta_i}, & |l_c| \le L_{max} \\ l_n a_0, & o.w \end{cases} \tag{2}$$

where $l_n$ represents a preference set $l_n=[d_{n1}, d_{n2}, d_{n3}, \ldots, d_{nl_n}]$ of user n, with $d_{nj} \in D_{total}$ and $1 \le j \le l_n$, while $D_{total}=[d_1, d_2, d_3, \ldots, d_{Dmax}]$ represents a preference set of all users in group $a_n$, $\beta_i$ represents the total number of preferences $d_{ni}$ in group $a_n$, $J_n$ represents a neighbor set of user n, $a_n$ represents a group to which user n belongs, $a_{J_n}$ represents a group to which the neighbor set of user n belongs, $a_0$ represents a preference cost, $l_c$ represents a preference identical to that of other users in group $a_n$, and $L_{max}$ represents all preferences in group $a_n$.

The utility function may be expressed as:

$$u_n(a_n, a_{-n}) = r_n(a_n, a_{J_n}) \tag{3}$$

where $a_{-n}$, represents a group $a_n$ after user n leaves the group $a_n$.

In some embodiments, the selfish preference may be expressed as:

$$a_n \succ_n \bar{a}_n \Leftrightarrow r_n(\bar{a}_n) \wedge r_i(a_n) \succ r_i(a_n \setminus \{n\}) \forall i \in a_n \setminus \{n\} \tag{4}$$

where $a_n$ represents the current group to which a user belongs, while $\bar{a}_n$ represents a group that a user will choose to join based on the selfish preference order, with the group $a_n$ and group $\bar{a}_n \in P$, $r_n(a_n)$ represents the return for a user in group $a_n$, $r_n(\bar{a}_n)$ represents the return for the user in group $\bar{a}_n$, and $r_i(a_n)$ represents an overall return of group $a_n$.

The combining rule may be expressed as:

$$\{a_n \cup \bar{a}_n\} \Leftrightarrow [\forall i \in a_n (a_n \cup \bar{a}_n) \succ_i a_n] \wedge [\forall i \in a_n (a_n \cup \bar{a}_n) \succ_i \bar{a}_n] \tag{5}$$

The splitting rule may be expressed as:

$$\{a_n, \bar{a}_n\} \Leftrightarrow [\exists i \in a_n a_n \succ_i (a_n \cup \bar{a}_n)] \vee [\forall i \in \bar{a}_n \bar{a}_n \succ_i (a_n \cup \bar{a}_n)] \tag{6}$$

In some embodiments, the Nash equilibrium point in step 2 may be obtained by the following steps. A group formation process is regarded as an exact potential game, and an optimum response algorithm is used to converge a potential function in the potential game to obtain the Nash equilibrium point.

The potential function of the potential game may represent the sum of the social values of all users and may be expressed as:

$$\phi(a_n, a_{-n}) = \sum_{n=1}^{N} S_n(a_n, a_{-n}). \tag{8}$$

The present disclosure also proposes a group division system based on a social relationship in combination with a selfish preference order, the system includes a preliminary group establishing module and a stable group establishing module.

The preliminary group establishing module is configured to form a preliminary group by simulating choices of users to gather into groups for sharing cost based on social values of the users.

The stable group establishing module is configured to: draw up combining and splitting rules according to a selfish preference order, subject the group obtained in the preliminary group establishing module to combining or splitting on the basis of the combining and splitting rules, and end the combining or splitting upon reaching a Nash equilibrium point, thereby obtaining stable groups.

Simulating choices of users to gather into groups for sharing cost based on social values of the users may be expressed as: M={S, v, F, A, P}, where S represents a decision-making user set, while v represents a utility function, F represents a decision function for deciding whether each user joins or leaves one of the groups, A={$a_1$, $a_2$, ..., $a_N$} represents a total user decision set, $a_n$ represents group n, P represents a group structure P={$CO_1$, $CO_2$, ..., $CO_n$} with $CO_n$ representing a structural characteristic of group $a_n$ and the utility function is defined as the cost of the current group to which a user belongs.

In some embodiments, the cost of group $a_n$ to which the user n belongs may be expressed as:

$$r_n(a_n, a_{Jn}) = \begin{cases} \sum_{i=1}^{l_n} \dfrac{a_0}{\beta_i}, & |l_c| \leq L_{max} \\ l_n a_0, & o.w \end{cases}$$

where $l_n$ represents a preference set $l_n$=[$d_{n1}$, $d_{n2}$, $d_{n3}$, ..., $d_{nln}$] of user n, with $d_{nj} \in D_{total}$ and $1 \leq j \leq l_n$, while $D_{total}$=[$d_1$, $d_2$, $d_3$, ..., $d_{Dmax}$] represents a preference set of all users in group $a_n$, $\beta_i$ represents a total number of preferences $d_{ni}$ in group $a_n$, $J_n$ represents a neighbor set of user n, $a_n$ represents a group to which the user n belongs, $a_{Jn}$ represents a group to which the neighbor set of user n belongs, $a_0$ represents a preference cost, $l_c$ represents a preference identical to that of other users in group $a_n$, and $L_{max}$ represents all preferences in group $a_n$.

The utility function may be expressed as:

$$u_n(a_n, a_{-n}) = r_n(a_n, a_{Jn})$$

where $a_{-n}$ represents a group $a_n$ after user n leaving the group $a_n$.

In some embodiments, the social value of user n may be expressed as:

$$S_n(a_n, a_{-n}) = \sum_i \beta_i - l_n.$$

In some embodiments, the selfish preference may be expressed as:

$$a_n \succ_n \bar{a}_n \Leftrightarrow r_n(a_n) < r_n(\bar{a}_n) \wedge r_i(a_n) < r_i(a_n \setminus \{n\}) \forall i \in a_n \setminus \{n\}$$

where $a_n$ represents the current group to which a user belongs, while $\bar{a}_n$ represents a group that a user will choose to join based on the selfish preference order, with group $a_n$ and group $\bar{a}_n \in P$, $r_n(a_n)$ represents the return for a user in group $a_n$, $r_n(\bar{a}_n)$ represents the return for the user in group $\bar{a}_n$, and $r_i(a_n)$ represents overall return of the group $a_n$.

The combining rule may be expressed as:

$$\{a_n \cup \bar{a}_n\} \Leftrightarrow [\forall i \in a_n, (a_n \cup \bar{a}_n) \succ_i a_n] \wedge [\forall i \in a_n, (a_n \cup \bar{a}_n) \succ_i \bar{a}_n].$$

The splitting rule may be expressed as:

$$\{a_n, \bar{a}_n\} \Leftrightarrow [\exists i \in a_n, a_n \succ_i (a_n \cup \bar{a}_n)] \vee [\forall i \in \bar{a}_n, a_n \succ_i (a_n \cup \bar{a}_n)].$$

In some embodiments, the Nash equilibrium point may be obtained by the following steps.

A group formation process is regarded as an exact potential game, and an optimum response algorithm is used to converge a potential function in the potential game to obtain the Nash equilibrium point.

The potential function of the potential game may represent the sum of the social values of all users and may be expressed as:

$$\phi(a_n, a_{-n}) = \sum_{n=1}^{N} S_n(a_n, a_{-n}).$$

Beneficial effects: the present disclosure has the following advantages.

1. The division method of the present disclosure can significantly improve group users' satisfaction with group division and avoid the existence of extreme users in the group.

2. The method of the present disclosure creates games among group users, and takes the selfishness of a user into account as compared with conventional group division methods. The process of making a choice by group users is simulated according to the selfish preference order, and the Nash equilibrium point is found out to achieve stable group division, thereby laying a solid foundation for the effects of group recommendation.

3. The method of the present disclosure takes the social relationship between group users into account, and well solves the problem of users' profits. So that the profits of the group users are maximized when choices are made by them.

BRIEF DESCRIPTION OF THE DRAWINGS

The sole drawing is a flowchart of a division method based on a social relationship in combination with a selfish preference order.

DESCRIPTION OF THE PREFERRED EMBODIMENTS

The present disclosure is now further described in conjunction with the accompanying drawings and embodiments.

A group division method based on a social relationship in combination with a selfish preference order provided in an embodiment specifically includes the following steps.

In step 1, preliminary groups are formed by simulating choices of users to gather into groups for sharing cost based on social values of the users, with the social values being reflected by the cost. Specifically, the social values of the users are considered according to their cost requirements. When the users in each group need more similar things, they will pay less cost, and thus, the returns of the group will be higher. The social relationship between users can help them reduce costs. If the preference sets of two users overlap more, their relationship will be closer. If two users are in a close relationship, they can form a group, so that they will pay less cost for the recommended content.

A preference set of all users in a group is denoted as $D_{total}=[d_1, d_2, d_3, \ldots, d_{Dmax}]$, and a preference set of user n is denoted as $l_n=[d_1, d_2, d_n3, \ldots, d_{nln}]$, with $d_{nj} \in D_{total}$ and $1 \leq j \leq l_n$. It is assumed that user n selects group $a_n=m$, with $1 \leq m \leq M$, where M is the number of groups. A neighbor set of user n is defined as being formed by other users in the group, and $a_{Jn}$ represents a group to which the neighbor set of user n belongs, with $J_n=\{i: a_i=a_n, i \in M \backslash n\}$.

The total number of users in a group is assumed to $CO_m$. According to a preference set vector of user n, the numbers of various identical data shared by user n and other users in group $a_n$ except for the user n are calculated and denoted as $\beta_n=\{\beta_1, \beta_2, \ldots, \beta_{ln}\}$ of user n, corresponding to the preference set vector $l_n$ of user n, with $\beta_n=1, 2, \ldots$ representing the total number of preferences $d_{ni}$ in a group.

In this embodiment, the social relationship between a user and a group is reflected by the social value of user n, and the social value of user n is expressed as:

$$S_n(a_n, a_{-n}) = \sum_i \beta_i - l_n. \qquad (1)$$

The costs of repeated are shared equally by corresponding users, and other are paid by the user alone. Otherwise, the user cannot joint the group and needs to bear all the costs alone.

The cost of group $a_n$ to which user n belongs can be calculated on the basis of the following equation:

$$r_n(a_n, a_{Jn}) = \begin{cases} \sum_{i=1}^{l_n} \dfrac{a_0}{\beta_i}, & |l_c| \leq L_{max} \\ l_n a_0, & o.w \end{cases} \qquad (2)$$

where $l_n$ represents a preference set $l_n=[d_{n1}, d_{n2}, d_{n3}, \ldots, d_{nln}]$ of user n, with $d_{nj} \in D_{total}$ and $1 \leq j \leq l_n$, while $D_{total}=[d_1, d_2, d_3, \ldots, d_{Dmax}]$ represents a preference set of all users in group $a_n$, $\beta_i$ represents a total number of preference $d_{ni}$ in group $a_n$, $J_n$ represents a neighbor set of user n, $a_n$ represents a group to which user n belongs, $a_{Jn}$ represents a group to which the neighbor set of user n belongs, $a_0$ represents a preference cost, $l_c$ represents a preference identical to that of other users in group $a_n$, and $L_{max}$ represents all preferences in group $a_n$.

The choices of users to gather into a group for sharing cost based on the social relationship is simulated and expressed as: $M=\{S, v, F, A, P\}$, where S represents a decision-making user set, while v represents a utility function, F represents a decision function for deciding whether a user joins or leaves a group, $A=\{a_1, a_2, \ldots, a_N\}$ represents a total user decision set, $a_n$ represents group n, and P represents a group structure $P=\{CO_1, CO_2, \ldots, CO_n\}$, with $CO_n$ representing a structural characteristic of group $a_n$, and the utility function v is defined as the cost of the current group to which a user belongs, which is expressed as:

$$u_n(a_n, a_{-n}) = r_n(a_n, a_{Jn}) \qquad (3).$$

The cost of each user is reduced by forming a better group structure, thereby achieving the effect of stable division.

In step 2, users choose respective groups with higher returns, and the selfish preference order causes group users to selfishly choose the group that maximizes their profits in order to seek higher profits. Therefore, game rules are drawn up according to the selfish preference order to simulate the choices of the group users.

Specifically, as regards user n, current group $a_n$ to which user n belongs, group $\bar{a}_n$ that the user will choose to join based on the selfish preference order, group $a_n$ and $\bar{a}_n$ meet $a_n$ and $\bar{a}_n \in P$.

User n does not care about the profits of other users in group $a_n$, and just chooses a group with higher returns and chooses the group that maximizes the profits based on the selfish preference order to seek higher profits. This process may be expressed as:

$$a_n \succ_n \bar{a}_n \Leftrightarrow r_n(\bar{a}_n) < r_n(a_n) \wedge r_i(a_n) < r_i(a_n \backslash \{n\}) \forall i \in a_n \backslash \{n\} \qquad (4)$$

where $r_n(a_n)$ represents the return for user n in group $a_n$, while $r_n(\bar{a}_n)$ represents the return for user n in group $\bar{a}_n$, and $r_i(a_n)$ represents the overall return of group $a_n$.

Users in group $a_n$ and group $\bar{a}_n$ all have considerable returns. The current group to which a user belongs is denoted as group $a_n$, and if the overall cost of group $\bar{a}_n$ may be reduced and the costs of other users in group $a_n$ may not increase when user n chooses to join group $\bar{a}_n$ based on the selfish preference order, group $a_n$ and group $\bar{a}_n$ may be combined into a new group. This process is defined as a combining rule and expressed as follows:

$$\{a_n \cup \bar{a}_n\} \Leftrightarrow [\forall i \in a_n, (a_n \cup \bar{a}_n) \succ_i a_n] \wedge [\forall i \in a_n, (a_n \cup \bar{a}_n) \succ_i \bar{a}_n] \qquad (5).$$

The current group to which a user belongs is denoted as group $a_n$, and if a user leaving group $a_n$ may result in a lower cost of the group $a_n$, group $a_n$ is split into two parts, where a group to which the user belongs after the splitting is denoted as $\bar{a}_n$, and other users in the other part choose to join other groups according to their respective selfish preference orders. This process is defined as a splitting rule and expressed as follows:

$$\{a_n, \bar{a}_n\} \Leftrightarrow [\exists i \in a_n, a_n \succ_i (a_n \cup \bar{a}_n)] \vee [\forall i \in \bar{a}_n, \bar{a}_n \succ_i (a_n \cup \bar{a}_n)] \qquad (6).$$

In step 3, when looking back at the group formation process from the perspective of a user, the group formation process may be simulated as an exact potential game, and the potential game has at least one Nash equilibrium point. According to the potential game theory, it can be obtained that the division process of step 2 is finite. When the Nash equilibrium point is achieved, all the group users would not be motivated to leave the group, to realize stable division. The effect of stable group division can be achieved by finding out the Nash equilibrium point.

It is described below that the group formation process may be simulated as the exact potential game.

When a user changes the decision unilaterally, the change in the difference of a potential function is identical to that in the difference of a utility function, indicating that the division process of step 2 is the exact potential game having the potential function, which is expressed as:

$$\phi(\bar{a}_n, \bar{a}_{-n}) - \phi(a_n, a_{-n}) = u_n(\bar{a}_n, \bar{a}_{-n}) - u_n(a_n, a_{-n}) \qquad (7).$$

According to the definition, the exact potential game always shows a Nash equilibrium. The potential function of the present disclosure represents the sum of the social values of all users and is expressed as:

$$\phi(a_n, a_{-n}) = \sum_{n=1}^{N} S_n(a_n, a_{-n}). \quad (8)$$

Usually, higher social values will bring about higher returns. The social values reflect the returns of a group. Thus, the social value is used as indicator.

It is assumed that user n will make a decision unilaterally to leave group $a_n$ and join group $\bar{a}_n$, and $S_n(a_n, a_{-n})$ represents the change in the social value of user n after leaving group $a_n$, while $S_n(\bar{a}_n, \bar{a}_{-n})$ represents the change in the social value of user n after joining group $\bar{a}_n$:

$$s_n(a_n, a_{-n}) - s_n(\bar{a}_n, \bar{a}_{-n}) = \sum_i \beta_i - l_n - \sum_i \beta_i' + \beta_i' + l_n = \sum_i (\beta_i - \beta_i') \quad (9)$$

where $a_{-n}$ represents a group after user n leaves group $a_n$, while $\bar{a}_{-n}$ represents a group before user n joints group $\bar{a}_n$, $l_n$ represents a preference set $l_n=[d_{n1}, d_{n2}, d_{n3}, \ldots, d_{nln}]$ of user n, with $d_{nj} \in D_{total}$ and $1 \leq j \leq l_n$, $\beta_i$ represents the total number of preferences $d_{ni}$ in group $a_n$, and $\beta_i'$ represents the total number of preferences $d_{ni}$ in group $a_{-n}$.

The change of the potential function is expressed as:

$$\phi(a_n, a_{-n}) - \phi(\bar{a}_n, \bar{a}_{-n}) \quad (10)$$

$$= \sum_{i=1}^{N} [s_n(a_n, a_{-n}) - s_n(\bar{a}_n, \bar{a}_{-n})]$$

$$= s_n(a_n, a_{-n}) - s_n(\bar{a}_n, \bar{a}_{-n})$$

$$+ \sum_{i \in J_{a_n}} [s_n(a_n, a_{-n}) - s_n(\bar{a}_n, \bar{a}_{-n})]$$

$$+ \sum_{i \in J_{\bar{a}_n}} [s_n(a_n, a_{-n}) - s_n(\bar{a}_n, \bar{a}_{-n})]$$

$$+ \sum_{i \in o.w} [s_n(a_n, a_{-n}) - s_n(\bar{a}_n, \bar{a}_{-n})]$$

where N represents a user set which is divided into four parts: user n, other users denoted as $J_{an}$ in group $a_n$, other users denoted as $J_{\bar{a}}$ in group $\bar{a}_n$ that the user will join, and remaining users.

User n leaves group $a_n$, other users in group $a_n$ experience a decrease in social value, and the decrease is exactly equal to the social value of user n. User n joins group $\bar{a}_n$, other users in group $\bar{a}_n$ experience an increase in social value, and the increase is exactly equal to the social value of user n, while the social values of the remaining users remain unchanged. Such changes in social value are mathematically expressed as:

$$\sum_{i \in o.w} s_n(a_n, a_{-n}) - s_n(\bar{a}_n, \bar{a}_{-n}) = 0 \quad (11)$$

$$\sum_{i \in J_{a_n}} s_n(a_n, a_{-n}) - s_n(\bar{a}_n, \bar{a}_{-n}) = -\sum_i (\beta_i - \beta_i')$$

$$\sum_{i \in J_{\bar{a}_n}} s_n(a_n, a_{-n}) - s_n(\bar{a}_n, \bar{a}_{-n}) = \sum_i (\beta_i - \beta_i').$$

Accordingly, the change of the potential function is expressed as:

$$\phi(a_n, a_{-n}) - \phi(\bar{a}_n, \bar{a}_{-n}) = \Sigma(\beta_i - \beta_i') = s_n(a_n, a_{-n}) - s_n(\bar{a}_n, \bar{a}_{-n}) \quad (12).$$

To sum up, the group formation process is the exact potential game, guaranteeing the group division stability in the method of the present disclosure.

Based on the finite improvement nature of the exact potential game, an optimum response algorithm in the potential game is always converged at the Nash equilibrium. According to the Nash equilibrium theorem, the following equations are given:

$$NA = (NA^1, \ldots, NA^{|G|}) \quad (13)$$

$$NA^i = (NA_1^i, \ldots, NA_N^i), \sum_{j=1}^{N} NA_j^i = 1. \quad (14)$$

After group division reaches the Nash equilibrium point, the users in groups would not be motivated to leave their respective groups. Thus, the group division reaches a stable state, and the returns of groups are maximized. Therefore, the current results are acceptable for each user in the groups.

This embodiment further provides a group division system based on a social relationship in combination with a selfish preference order, including a preliminary group establishing module and a stable group establishing module.

The preliminary group establishing module is configured to form a preliminary group by simulating choices of users to gather into groups for sharing cost based on social values of the users.

The stable group establishing module is configured to: draw up combining and splitting rules according to a selfish preference order, subject the groups obtained in step 1 to combining or splitting on the basis of the combining and splitting rules, and end the combining or splitting upon reaching a Nash equilibrium point, thereby obtaining a stable group. The process of simulating the choices of users to gather into groups for sharing cost based on social values of the users may be expressed as: $M=\{S, v, F, A, P\}$, where S represents a decision-making user set, while v a utility function, F represents a decision function for deciding whether each user joins or leaves a group, $A=\{a_1, a_2, \ldots, a_N\}$ represents a total user decision set, $a_n$ represents group n, and P represents a group structure $P=\{CO_1, CO_2, \ldots, CO_n\}$, with $CO_n$ representing a structural characteristic of group $a_n$, and the utility function is defined as the cost of the current group to which a user belongs.

Alternatively, the cost of group $a_n$ to which a user belongs is expressed as:

$$r_n(a_n, a_{J_n}) = \begin{cases} \sum_{i=1}^{l_n} \dfrac{a_0}{\beta_i}, & |l_c| \leq L_{max} \\ l_n a_0, & o.w \end{cases}$$

where $l_n$ represents a preference set $l_n=[d_{n1}, d_{n2}, d_{n3}, \ldots, d_{nln}]$ of user n, with $d_{nj} \in D_{total}$ and $1 \leq j \leq l_n$, while $D_{total}=[d_1, d_2, d_3, \ldots, d_{Dmax}]$ represents a preference set of all users in group $a_n$, $\beta_i$ represents a total number of preferences $d_{ni}$ in group $a_n$, $J_n$ represents a neighbor set of user n, $a_n$ represents a group to which user n belongs, $a_{J_n}$ represents a group to which the neighbor set of user n belongs, $a_0$ represents a preference cost, $l_c$ represents a preference identical to that of other users in group $a_n$, and $L_{max}$ represents all preferences in group $a_n$.

The utility function is expressed as:

$$u_n(a_n, a_{-n}) = r_n(a_n, a_{Jn})$$

where $a_{-n}$ represents a group after user n leaving the group $a_n$.

Alternatively, the social value of user n is expressed as:

$$S_n(a_n, a_{-n}) = \sum_i \beta_i - l_n.$$

Alternatively, the selfish preference is expressed as:

$$a_n \succ_n \bar{a}_n \Leftrightarrow r_n(a_n) < r_n(\bar{a}_n) \wedge r_i(a_n) < r_i(a_n \backslash \{n\}) \forall i \in a_n \backslash \{n\}$$

where $a_n$ represents the current group to which a user belongs, while $\bar{a}_n$ represents a group that a user will choose to join based on the selfish preference order, with group $a_n$ and group $\bar{a}_n \in P$, $r_n(a_n)$ represents the return for a user in group $a_n$, $r_n(\bar{a}_n)$ represents the return for the user in group $\bar{a}_n$, and $r_i(a_n)$ represents overall return of group $a_n$.

The combining rule is expressed as:

$$\{a_n \cup \bar{a}_n\} \Leftrightarrow [\forall i \in a_n, (a_n \cup \bar{a}_n) \succ_i a_n] \wedge [\forall i \in a_n, (a_n \cup \bar{a}_n) \succ_i \bar{a}_n] \quad (5).$$

The splitting rule may be expressed as:

$$\{a_n, \bar{a}_n\} \Leftrightarrow [\exists i \in a_n, a_n \succ_i (a_n \cup \bar{a}_n)] \vee [\forall i \in \bar{a}_n, \bar{a}_n \succ_i (a_n \cup \bar{a}_n)] \quad (6).$$

Alternatively, the Nash equilibrium point is obtained by the following steps.

A group formation process is regarded as an exact potential game, and an optimum response algorithm is used to converge a potential function in the potential game to obtain the Nash equilibrium point.

The potential function of the potential game represents the sum of the social values of all users and is expressed as:

$$\phi(a_n, a_{-n}) = \sum_{n=1}^{N} S_n(a_n, a_{-n}).$$

What is claimed is:

1. A group division method based on a social relationship in combination with a selfish preference order, comprising following steps:
   forming step for forming a preliminary group by simulating choices of users to gather into groups for sharing cost based on social values of the users; and
   drawing up step for drawing up combining and splitting rules according to a selfish preference order, subjecting the groups obtained in the forming step to combining or splitting on a basis of the combining and splitting rules, and ending the combining or splitting upon reaching a Nash equilibrium point, thereby obtaining stable groups;
   wherein the simulating choices of users to gather into groups for sharing cost based on social values of the users is expressed as: $M=\{S, v, F, A, P\}$, wherein S represents a decision-making user set, while v represents a utility function, F represents a decision function for deciding whether each user joins or leaves one of the groups, $A=\{a_1, a_2, \ldots, a_N\}$ represents a total user decision set, $a_n$ represents group to which a user n belongs, P represents a group structure $P=\{CO_1, CO_2, \ldots, CO_n\}$, with representing a structural characteristic of group $a_n$, and the utility function is defined as a cost of a current group to which a user belongs.

2. The group division method based on a social relationship in combination with a selfish preference order according to claim 1, wherein the cost of group $a_n$ to which the user belongs is expressed as:

$$r_n(a_n, a_{Jn}) = \begin{cases} \sum_{i=1}^{l_n} \frac{a_0}{\beta_i}, & |l_c| \leq L_{max} \\ l_n a_0, & o.w \end{cases} \quad (2)$$

wherein $l_n$ represents a preference set $l_n=[d_{n1}, d_{n2}, d_{n3}, \ldots, d_{nln}]$ of user n, with $d_{nj} \in D_{total}$ and $1 \leq j \leq l_n$, while $D_{total}=[d_1, d_2, d_3, \ldots, d_{Dmax}]$ represents a preference set of all users in group $a_n$, $\beta_i$ represents a total number of preferences $d_{ni}$ in group $a_n$, $J_n$ represents a neighbor set of the user n, $a_n$ represents a group to which the user n belongs, $a_{Jn}$ represents a group to which the neighbor set of the user n belongs, $a_0$ represents a preference cost, $l_c$ represents a preference identical to that of other users in group $a_n$, $L_{max}$ represents all preferences in group $a_n$; and
the utility function is expressed as:

$$u_n(a_n, a_{-n}) = r_n(a_n, a_{Jn}) \quad (3)$$

wherein $a_{-n}$ represents a group $a_n$ after user n leaving the group $a_n$.

3. The group division method based on a social relationship in combination with a selfish preference order according to claim 2, wherein the social value of the user n is expressed as:

$$S_n(a_n, a_{-n}) = \sum_i \beta_i - l_n. \quad (1)$$

4. The group division method based on a social relationship in combination with a selfish preference order according to claim 1, wherein the selfish preference is expressed as:

$$a_n \succ_n \bar{a}_n \Leftrightarrow r_n(a_n) < r_n(\bar{a}_n) \wedge r_i(a_n) > r_i(a_n \backslash \{n\}) \forall i \in a_n \backslash \{n\} \quad (4)$$

wherein $a_n$ represents the current group to which the user n belongs, while $\bar{a}_n$ represents a group that a user will choose to join based on the selfish preference order, with the group $a_n$ and group $\bar{a}_n \in p$, $r_n(a_n)$ represents the return for the user n in the group $a_n$, $r_n(\bar{a}_n)$, represents the return for the user n in the group $\bar{a}_n$, and $r_i(a_n)$ represents an overall return of the group $a_n$;
the combining rule is expressed as:

$$\{a_n \cup \bar{a}_n\} \Leftrightarrow [\forall i \in a_n, (a_n \cup \bar{a}_n) \succ_i a_n] \wedge [\forall i \in a_n, (a_n \cup \bar{a}_n) \succ_i \bar{a}_n] \quad (5)$$

and the splitting rule is expressed as:

$$\{a_n, \bar{a}_n\} \Leftrightarrow [\exists i \in a_n, a_n \succ_i (a_n \cup \bar{a}_n)] \vee [\forall i \in \bar{a}_n, \bar{a}_n \succ_i (a_n \cup \bar{a}_n)] \quad (6).$$

5. The group division method based on a social relationship in combination with a selfish preference order according to claim 3, wherein the Nash equilibrium point in the drawing up step is obtained by following steps:
   regarding a group formation process of each of stable groups as a potential game, and using an optimum response algorithm to converge a potential function in the potential game to obtain the Nash equilibrium point;

wherein the potential function of the potential game represents a sum of the social values of all users, which is expressed as:

$$\phi(a_n, a_{-n}) = \sum_{n=1}^{N} S_n(a_n, a_{-n}). \quad (8)$$

6. A group division system based on a social relationship in combination with a selfish preference order, comprising:
a preliminary group establishing module, configured to form a preliminary group by simulating choices of users to gather into groups for sharing cost based on social values of the users; and
a stable group establishing module, configured to draw up combining and splitting rules according to a selfish preference order, subject the groups obtained in the preliminary group establishing module to combining or splitting on a basis of the combining and splitting rules, and end the combining or splitting upon reaching a Nash equilibrium point, thereby obtaining stable groups;
wherein the simulating choices of users to gather into groups for sharing cost based on social values of the users is expressed as: M={S, v, F, A, P}, wherein S represents a decision-making user set, while v represents a utility function, F represents a decision function for deciding whether each user joins or leaves one of the groups, A={$a_1, a_2, \ldots, a_N$} represents a total user decision set, $a_n$ represents group to which a user n belongs, P represents a group structure, with representing a structural characteristic of group $a_n$, and the utility function is defined as the cost of a current group to which a user belongs.

7. The group division system based on a social relationship in combination with a selfish preference order according to claim 6, wherein the cost of group $a_n$ to which the user n belongs is expressed as:

$$r_n(a_n, a_{Jn}) = \begin{cases} \sum_{i=1}^{l_n} \frac{a_0}{\beta_i}, & |l_c| \le L_{max} \\ l_n a_0, & o.w \end{cases}$$

wherein $l_n$ represents a preference set $l_n=[d_{n1}, d_{n2}, d_{n3}, \ldots, d_{nln}]$ of user n, with $d_{nj} \in D_{total}$ and $1 \le j \le l_n$, while $D_{total}=[d_1, d_2, d_3, \ldots, d_{Dmax}]$ represents a preference set of all users in group $a_n$, $\beta_i$ represents a total number of preferences $d_{ni}$ in group $a_n$, $J_n$ represents a neighbor set of user n, $a_n$ represents a group to which the user n belongs, $a_{Jn}$ represents a group to which the neighbor set of the user n belongs, $a_0$ represents a preference cost, $l_c$ represents a preference identical to that of other users in group $a_n$, $L_{max}$ represents all preferences in group $a_n$; and
the utility function is expressed as:

$$u_n(a_n, a_{-n}) = r_n(a_n, a_{Jn})$$

wherein $a_{-n}$ represents a group $a_n$ after user n leaving the group $a_n$.

8. The group division system based on a social relationship in combination with a selfish preference order according to claim 7, wherein the social value of the user n is expressed as:

$$S_n(a_n, a_{-n}) = \sum_i \beta_i - l_n.$$

9. The group division system based on a social relationship in combination with a selfish preference order according to claim 6, wherein the selfish preference is expressed as:

$$a_n \succ_n \bar{a}_n \Leftrightarrow r_n(a_n) < r_n(\bar{a}_n) \wedge r_i(a_n) < r_i(a_n \setminus \{n\}) \forall i \in a_n \setminus \{n\}$$

wherein $a_n$ represents the current group to which the user n belongs, while $\bar{a}_n$ represents a n group that a user will choose to join based on the selfish preference order, with the group $a_n$ and group $\bar{a}_n \in p$, $r_n(a_n)$ represents the return for the user n in the group $a_n$, $r_n(\bar{a}_n)$ represents the return for the user n in the group $\bar{a}_n$, and $r_i(a_n)$ represents an overall return of the group $a_n$;
the combining rule is expressed as:

$$\{a_n \cup \bar{a}_n\} \Leftrightarrow [\forall i \in a_n, (a_n \cup \bar{a}_n) \succ_i a_n] \wedge [\forall i \in a_n, (a_n \cup \bar{a}_n) \succ_i \bar{a}_n]$$

and the splitting rule may be expressed as:

$$\{a_n, \bar{a}_n\} \Leftrightarrow [\exists i \in a_n, a_n \succ_i (a_n \cup \bar{a}_n)] \vee [\forall i \in \bar{a}_n, \bar{a}_n \succ_i (a_n \cup \bar{a}_n)].$$

10. The group division system based on a social relationship in combination with a selfish preference order according to claim 8, wherein the Nash equilibrium point is obtained by following steps:
regarding a group formation process of each of stable groups as a potential game, and using an optimum response algorithm to converge a potential function in the potential game to obtain the Nash equilibrium point;
wherein the potential function of the potential game represents a sum of the social values of all users, which is expressed as:

$$\phi(a_n, a_{-n}) = \sum_{n=1}^{N} S_n(a_n, a_{-n}).$$

* * * * *